United States Patent
Dinan et al.

(10) Patent No.: US 8,423,065 B2
(45) Date of Patent: Apr. 16, 2013

(54) METHOD AND COMPUTER-READABLE MEDIUM FOR DYNAMIC RATE CAPPING

(75) Inventors: Esmail Dinan, Herndon, VA (US); Vijay Rudraraju, Herndon, VA (US); Hemanth Balaji Pawar, Herndon, VA (US); Daniel Vivanco, Herndon, VA (US); Howard Bishop Anderson, Ashburn, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 830 days.

(21) Appl. No.: 12/487,743

(22) Filed: Jun. 19, 2009

(65) Prior Publication Data

US 2010/0323735 A1   Dec. 23, 2010

(51) Int. Cl.
*H04B 7/00* (2006.01)
*H04B 17/00* (2006.01)
*H04B 1/00* (2006.01)
*H04W 72/00* (2009.01)

(52) U.S. Cl.
USPC ........ 455/509; 455/453; 455/67.11; 455/63.1

(58) Field of Classification Search ............ 455/453, 455/452.1, 454, 450, 452.2
See application file for complete search history.

(56) References Cited

U.S. PATENT DOCUMENTS

| | | | | |
|---|---|---|---|---|
| 4,910,794 A * | 3/1990 | Mahany | 455/67.14 |
| 5,070,536 A * | 12/1991 | Mahany et al. | 455/67.14 |
| 5,857,147 A * | 1/1999 | Gardner et al. | 455/67.11 |
| 6,754,189 B1 * | 6/2004 | Cloutier et al. | 370/329 |
| 6,775,548 B1 * | 8/2004 | Rong et al. | 455/452.2 |
| 6,850,499 B2 * | 2/2005 | Wheatley et al. | 370/328 |
| 6,873,597 B1 * | 3/2005 | King | 370/235 |
| 7,103,021 B2 * | 9/2006 | Jou | 370/329 |
| 7,146,174 B2 * | 12/2006 | Gardner et al. | 455/453 |
| 7,245,922 B2 * | 7/2007 | Furuskar et al. | 455/453 |
| 7,274,730 B2 * | 9/2007 | Nakabayashi | 375/220 |
| 7,292,863 B2 * | 11/2007 | Chen et al. | 455/452.2 |
| 7,369,549 B2 * | 5/2008 | Wu et al. | 370/389 |
| 7,515,580 B2 * | 4/2009 | Wheatley et al. | 370/349 |
| 7,924,781 B2 * | 4/2011 | Jou | 370/329 |
| 8,041,302 B2 * | 10/2011 | Gardner et al. | 455/67.11 |

* cited by examiner

*Primary Examiner* — Tilahun B Gesesse
(74) *Attorney, Agent, or Firm* — Crowell & Moring LLP

(57) ABSTRACT

A method and computer-readable medium for dynamic rate capping of data transmissions of a subscriber are provided. According to the method, configuration parameters for dynamic rate capping are defined. A plurality of subscriber parameters are obtained, and a plurality of network parameters are measured. A rate boost factor is calculated based on a backhaul rate boost factor and a sector rate boost factor. A transmission rate cap for subscriber data transmissions is calculated based on backhaul and sector parameters, such as backhaul and sector rate boost factors. The rate of subscriber data transmissions is dynamically controlled based on the transmission rate cap.

20 Claims, 7 Drawing Sheets

METHOD AND COMPUTER-READABLE MEDIUM FOR DYNAMIC RATE CAPPING

BACKGROUND OF THE INVENTION

Communication systems have a limited capacity for carrying subscriber traffic, and accordingly many communication systems employ traffic shaping to control incoming traffic to guarantee performance and fairness by limiting packets which exceed predefined criteria. Current traffic shaping schemes perform rate capping per subscriber and service flow class, but do not consider sector and base station parameters. Known rate capping methods are static, i.e., the maximum and minimum rates are configured as fixed network parameters. For example, a subscriber with a 100 Kbps maximum rate cap will be capped at this rate regardless of whether there is additional backhaul and/or base station capacity. Thus, these known methods do not efficiently manage available resources.

SUMMARY OF THE INVENTION

The present invention provides a solution to the above-mentioned problem of the prior art by providing a method and computer-readable medium for dynamic rate capping of data transmissions of a subscriber (e.g., a user of wireless data transmission services), thereby managing transmission resources more efficiently. The method and computer-readable medium maximize a subscriber rate cap (i.e., data transmission rate cap for a subscriber) and network usage, while providing a fair medium to all subscribers and controlling excessive subscribers when they adversely impact other subscribers and network performance.

Other objects, advantages, and novel features of the present invention will become apparent from the following detailed description of the invention when considered in conjunction with the accompanying drawings.

DETAILED DESCRIPTION OF THE EXEMPLARY EMBODIMENTS

Figure 1:
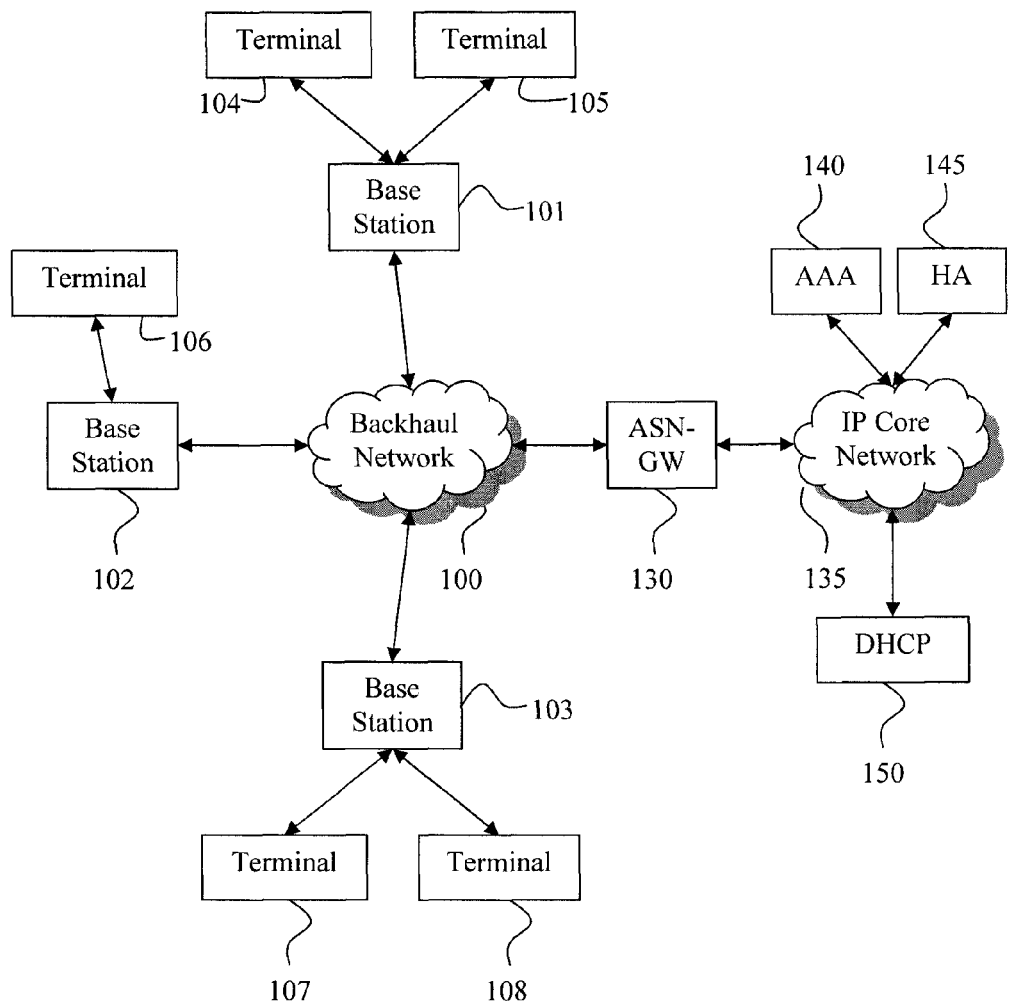
FIG. 1 illustrates an exemplary embodiment of a system in accordance with an exemplary embodiment of the present invention.

FIG. 1 illustrates an exemplary embodiment of a system in accordance with the present invention. Although a WiMAX network is illustrated in FIG. 1, the invention is applicable to other networks also. The system includes a Backhaul Network 100, Access Service Network Gateway (ASN-GW) 130, and an IP Core Network 135. Base Stations 101, 102 and 103 communicate with the ASN-GW 130 via the Backhaul Network 100. Terminals 104-108 communicate via an air interface with the Base Stations 101-103 and through the Backhaul Network 100 to the ASN-GW 130. Although FIG. 1 only illustrates five mobile stations, a plurality of mobile stations could be connected to any of the base stations, and the number of base stations can be varied as well.

The Access Service Network Gateway (ASN-GW) 130 connects the Backhaul Network 100 to the IP Core Network 135 and acts as a traffic aggregation point within the network. Connected to the IP Core Network 135 are an Authentication, Authorization and Accounting (AAA) Server 140, a Home Agent (HA) 145, and a Dynamic Host Control Protocol (DHCP) server 150. Other devices (not illustrated) may also be connected to the IP Core Network. The AAA server 140 supports authentication for the mobile stations, users and services. The home agent (HA) 145 determines a home network for a user and registers the user in the HA 145. The dynamic host configuration protocol (DHCP) server 150 may be used to provide centralized management of the IP addresses which are used on the IP Core Network 135.

Figure 2:
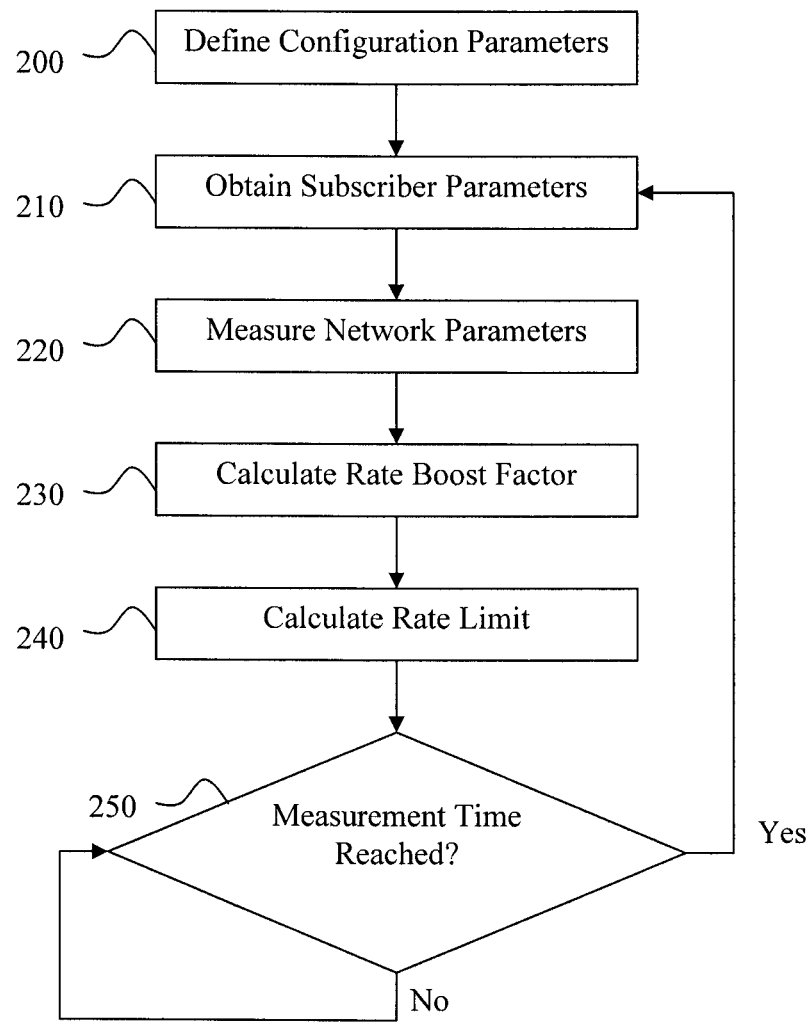
FIG. 2 illustrates an exemplary embodiment of a method for dynamic rate capping in accordance with the present invention.

FIG. 2 illustrates an exemplary embodiment of a method for dynamic rate capping of data transmissions. This method can be performed by a network element within the Backhaul Network 100, ASN-GW 130 and/or a base station, such as a Deep Packet Inspection (DPI) node or the like. As further described below, in exemplary embodiments of the present invention, the rate cap depends, in part, on the sector capacity and the backhaul capacity, which define an upper limit for the data transmission rate of the air interface and the backhaul, respectively. In step 200, configuration parameters for dynamic rate capping are defined. These parameters may include configuration constants (K1, K2), a maximum load threshold (TH) and a measurement time. The measurement time indicates how often a subscriber's rate cap is determined and/or modified.

In step 210, subscriber parameters are obtained, e.g., a bandwidth requested by a subscriber (Sub_Requested_BW), a minimum subscriber rate cap (Min_Sub_Rate_Cap), and a maximum subscriber rate cap (Max_Sub_Rate_Cap). The Sub_Requested_BW is typically requested automatically by an application running on a subscriber device (e.g., terminal 104), but may be manually requested by the subscriber. The Min_Sub_Rate_Cap and the Max_Sub_Rate_Cap are lower and upper limits, respectively, on the rate at which the subscriber can receive and/or transmit data.

Network parameters are measured in step 220. The network parameters include, for example, maximum sector capacity (Max_Sector_Capacity), sector load (Sector_Load), subscriber coverage quality (Sub_Coverage_Quality), maximum backhaul capacity (Max_Backhaul_Capacity), and backhaul load (Backhaul_Load). The backhaul parameters relate to the backhaul network 100 of the system. The sector parameters relate to the air interface between the base stations 101-103 and the terminals 104-108.

The subscriber coverage quality is based upon the subscriber's distance from the base station, signal interference and the like, and may be represented by a normalized value between 0 and 1. For example, Sub_Coverage_Quality may be set equal to a number of bits per slot divided by 480 (normalized between 0 and 1). See Table 1.

TABLE 1

| MCS | MIMO | Bits_per_Symbol | Symbols_per_Slot | Bits_per_Slot | Sub_Coverage_Quality |
|---|---|---|---|---|---|
| QPSK 1/8 | STC | 0.25 | 48 | 12 | 0.025 |
| QPSK 1/4 | STC | 0.5 | 48 | 24 | 0.05 |
| QPSK 1/2 | STC | 1 | 48 | 48 | 0.1 |
| QPSK 3/4 | STC | 1.5 | 48 | 72 | 0.15 |
| 16QAM 1/2 | STC | 2 | 48 | 96 | 0.2 |
| 16QAM 3/4 | STC | 3 | 48 | 144 | 0.3 |
| 64QAM 1/2 | STC | 3 | 48 | 144 | 0.3 |
| 64QAM 2/3 | STC | 4 | 48 | 192 | 0.4 |
| 64QAM 3/4 | STC | 4.5 | 48 | 216 | 0.45 |
| 64QAM 5/6 | STC | 5 | 48 | 240 | 0.5 |
| 64QAM 1/2 | SM | 6 | 48 | 288 | 0.6 |
| 64QAM 2/3 | SM | 8 | 48 | 384 | 0.8 |
| 64QAM 3/4 | SM | 9 | 48 | 432 | 0.9 |
| 64QAM 5/6 | SM | 10 | 48 | 480 | 1.0 |

Table 1 contains a plurality of modulation and coding schemes (MCS), including different types of quadrature phase shift keying (QPSK) and quadrature amplitude modulation (QAM). The second column of the table shows the type of multiple-input, multiple-output (MIMO) communications technology used in each example, where STC refers to space-time code and SM refers to spatial multiplexing.

According to the formula represented by Table 1 (bits per slot/480), a subscriber at a cell edge will have a low Sub_Coverage_Quality. Subscribers that are closer to the cell (receiving a signal with a high carrier to interference plus noise ratio (CINR)) can use a more efficient MCS and thus have a higher Sub_Coverage_Quality (closer to 1). As shown in Table 1, Sub_Coverage_Quality depends on the MCS efficiency used for transmission to a subscriber, which depends on CINR.

Max_Sector_Capacity may be defined as the average sector throughput divided by the average slot utilization in the air interface. Alternatively, other formulas may be used to define the Max_Sector_Capacity. For a given MCS transmission profile, a sector transmits at Max_Sector_Capacity when utilization is at 100%. For example, if a sector has an average sector throughput of 4 Mbps when average slot utilization=50%, then it will have a throughput of 8 Mbps when its radio resources are 100% utilized. Thus, the sector throughput has an approximately linear relationship with slot utilization, depending on the average MCS efficiency of data transmissions of the sector.

Based on a backhaul rate boost factor (Backhaul_Boost_Factor) and a sector rate boost factor (Sector_Boost_Factor), a rate boost factor (Boost_Factor) for the subscriber is calculated in step 230. For example, the Boost_Factor can be determined using the following formula:

Boost_Factor=Min(Backhaul_Boost_Factor, Sector_Boost_Factor, 1)

In an exemplary embodiment of the present invention, the Backhaul_Boost_Factor is determined by the formula:

Backhaul_Boost_Factor=$K1 \times (TH-$Backhaul_Load$) \times$ (Max_Backhaul_Capacity/Sub_Requested_$BW$)

The Sector_Boost_Factor may be determined, for example, by the formula:

$$\text{Sector\_Boost\_Factor} = K2 \times (TH\text{-Sector\_Load}) \times \frac{\text{Max\_Sector\_Capaticity}}{\text{Sub\_Requested\_BW}} \times \text{Sub\_Coverage\_Quality}$$

These formulas are merely exemplary, as other formulas may be used to determine the boost factor values.

In step 240, the rate cap for the subscriber (Sub_Rate_Cap) is calculated. For example, the Sub_Rate_Cap may be calculated using the following formula:

Sub_Rate_Cap=Min_Sub_Rate_Cap+Boost_Factor×
(Max_Sub_Rate_Cap−Min_Sub_Rate_Cap)

where the Boost_Factor is a number between 0 and 1. If the Boost_Factor=0, then the Sub_Rate_Cap=Min_Sub_Rate_Cap. If the Boost_Factor=1, then the Sub_Rate_Cap=Max_Sub_Rate_Cap. Alternatively, other formulas may be used to determine the Sub_Rate_Cap.

Table 2 (below) illustrates examples of subscriber parameters, network measurement parameters, boost factors and subscriber rate cap values. In the table, parameters that are varied from the reference example 1 to examples 2-5 are highlighted in bold. In the examples shown in Table 2, configuration constants K1=0.3 and K2=0.3, maximum load threshold TH=70%, and the measurement time=10 minutes. As illustrated in the table, the subscriber rate cap varies significantly depending upon changes in the sector and backhaul parameters, as well as subscriber coverage quality.

TABLE 2

| Rate_Cap_Timer | Subscriber Parameters | Network Measurement Parameters | Boost Factors | Subscriber Rate Cap |
|---|---|---|---|---|
| 1 Ref. | Sub_Requested_BW = 4 Mbps<br>Min_Sub_Rate_Cap = 500 kbps<br>Max_Sub_Rate_Cap = 4 Mbps | Max_Sector_Capacity = 15 Mbps<br>Sector_Load = 10%<br>Sub_Coverage_Quality = 1<br>Max_Backhaul_Capacity = 20 Mbps<br>Backhaul_Load = 15% | Sector_Boost_Factor = 0.675<br>Backhaul_Boost_Factor = 0.825<br>Boost_Factor = 0.675 | 2.862 Mbps |
| 2 | Sub_Requested_BW = 4 Mbps<br>Min_Sub_Rate_Cap = 500 kbps<br>Max_Sub_Rate_Cap = 4 Mbps | Max_Sector_Capacity = 15 Mbps<br>Sector_Load = 60%<br>Sub_Coverage_Quality = 1<br>Max_Backhaul_Capacity = 20 Mbps<br>Backhaul_Load = 15% | Sector_Boost_Factor = 0.112<br>Backhaul_Boost_Factor = 0.825<br>Boost_Factor = 0.112 | 0.892 Mbps |
| 3 | Sub_Requested_BW = 4 Mbps<br>Min_Sub_Rate_Cap = 500 kbps<br>Max_Sub_Rate_Cap = 4 Mbps | Max_Sector_Capacity = 15 Mbps<br>Sector_Load = 10%<br>Sub_Coverage_Quality = 1<br>Max_Backhaul_Capacity = 20 Mbps<br>Backhaul_Load = 70% | Sector_Boost_Factor = 0.675<br>Backhaul_Boost_Factor = 0<br>Boost_Factor = 0 | 0.500 Mbps |
| 4 | Sub_Requested_BW = 4 Mbps<br>Min_Sub_Rate_Cap = 500 kbps<br>Max_Sub_Rate_Cap = 4 Mbps | Max_Sector_Capacity = 15 Mbps<br>Sector_Load = 10%<br>Sub_Coverage_Quality = 0.2<br>Max_Backhaul_Capacity = 20 Mbps<br>Backhaul_Load = 15% | Sector_Boost_Factor = 0.135<br>Backhaul_Boost_Factor = 0.825<br>Boost_Factor = 0.135 | 0.972 Mbps |
| 5 | Sub_Requested_BW = 4 Mbps<br>Min_Sub_Rate_Cap = 500 kbps<br>Max_Sub_Rate_Cap = 4 Mbps | Max_Sector_Capacity = 5 Mbps<br>Sector_Load = 10%<br>Sub_Coverage_Quality = 1<br>Max_Backhaul_Capacity = 10 Mbps<br>Backhaul_Load = 15% | Sector_Boost_Factor = 0.225<br>Backhaul_Boost_Factor = 0.412<br>Boost_Factor = 0.225 | 1.287 Mbps |

In step 250, it is determined whether a predetermined measurement time has been reached. When the measurement time has been reached, the method returns to step 210 and steps 210-250 are repeated. Accordingly, a data transmission rate cap for a subscriber is periodically determined and a data transmission rate of the subscriber is dynamically adjusted by the ASN-GW 130.

Figure 3:
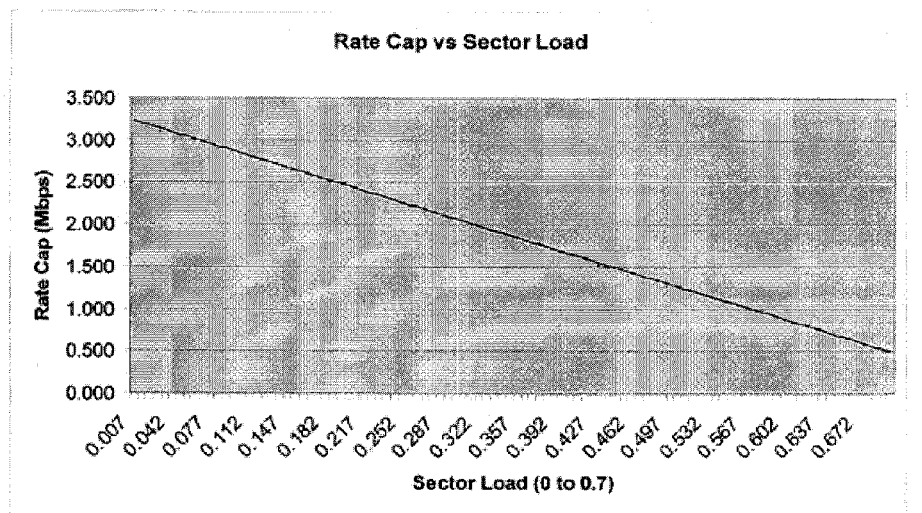
FIG. 3 illustrates a graph of rate cap versus sector load in accordance with an exemplary embodiment of the present invention.
Figure 4:
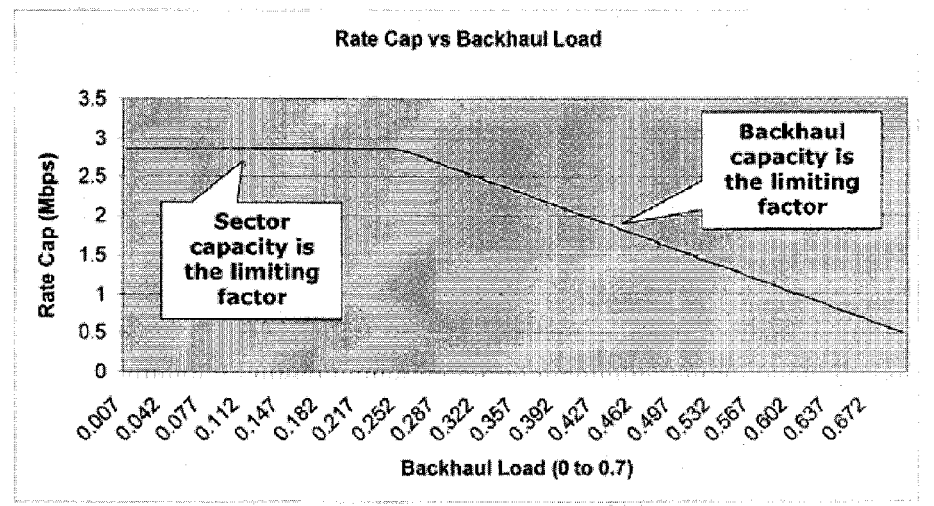
FIG. 4 illustrates a graph of rate cap versus backhaul load in accordance with an exemplary embodiment of the present invention.
Figure 5:
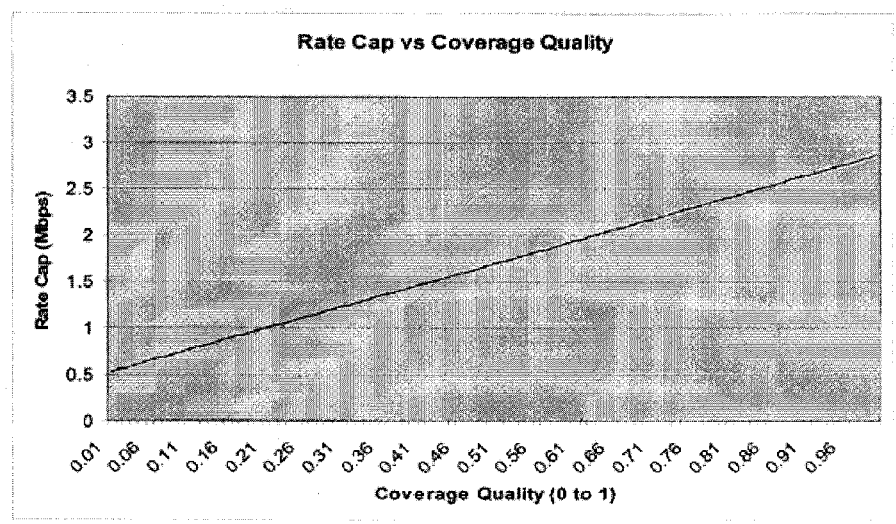
FIG. 5 illustrates a graph of rate cap versus coverage quality in accordance with an exemplary embodiment of the present invention.

FIGS. 3-7 illustrate graphs of rate cap versus various sector, coverage quality and backhaul parameters, based on the subscriber and network measurement parameters of reference example 1 in Table 2. As illustrated in FIG. 3, the rate cap of example 1 decreases approximately linearly as sector load increases. FIG. 4 shows that the rate cap remains approximately constant at low backhaul load values until backhaul capacity becomes the limiting factor. At that point, the rate cap decreases as the backhaul load increases. As illustrated in FIG. 5, the rate cap increases as the coverage quality increases.

Figure 6:
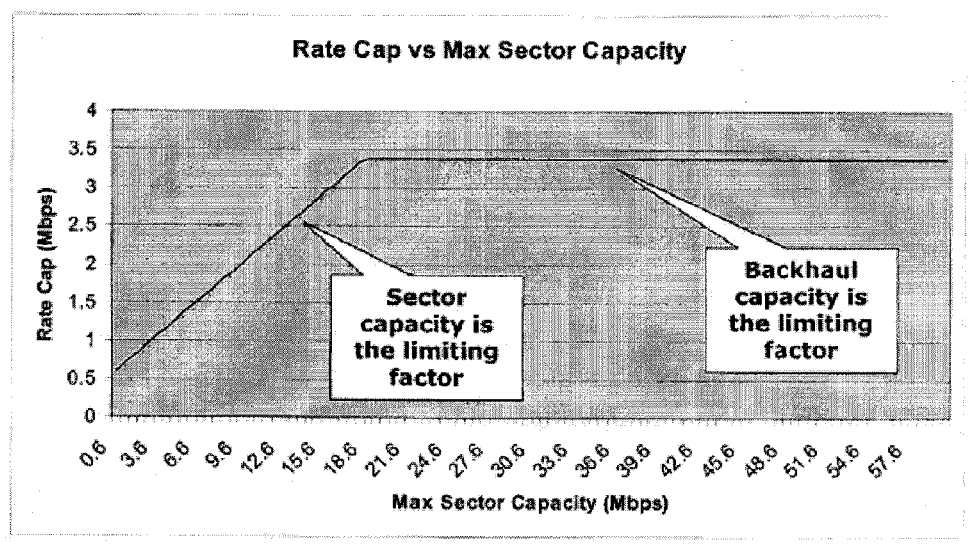
FIG. 6 illustrates a graph of rate cap versus max sector capacity in accordance with an exemplary embodiment of the present invention.
Figure 7:
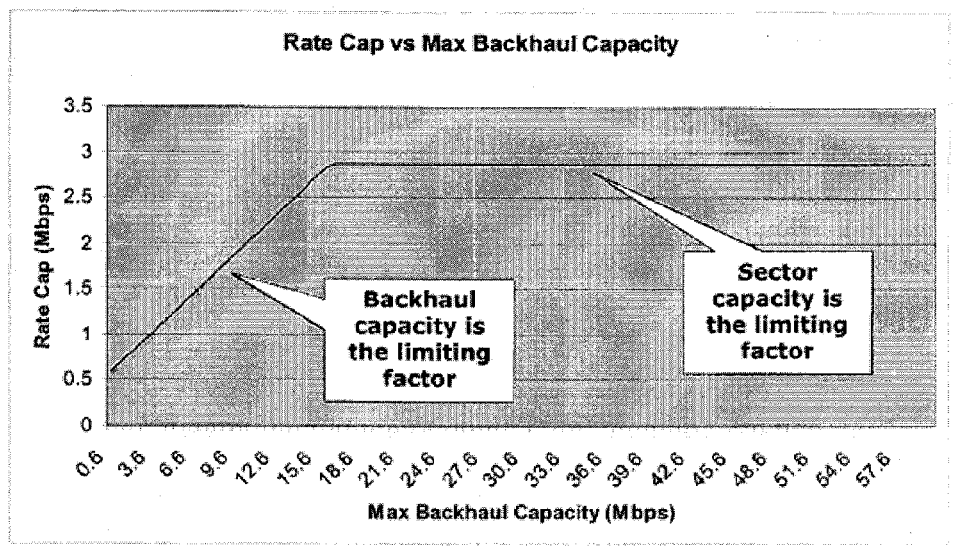
FIG. 7 illustrates a graph of rate cap versus max backhaul capacity in accordance with an exemplary embodiment of the present invention.

FIG. 6 shows that at low max sector capacity values, where the sector capacity is the limiting factor, the rate cap of example 1 increases approximately linearly as the max sector capacity increases. When the backhaul capacity becomes the limiting factor, the rate cap remains approximately constant as max sector capacity increases. As illustrated in FIG. 7, as the max backhaul capacity increases, the rate cap increases. When the sector capacity becomes the limiting factor, the rate cap becomes approximately constant.

In another exemplary embodiment, instead of using the foregoing formulas, lookup tables are used to determine the Sub_Rate_Cap, based on the network and subscriber parameters. Also, lookup tables may be used to determine the backhaul, sector and subscriber boost factors. The lookup tables may be present in the ASN-GW 130 or any other convenient location.

In another exemplary embodiment of the present invention, there is a computer-readable medium encoded with a computer program for dynamic rate capping of subscriber data transmissions. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

An exemplary embodiment of a computer-readable medium encoded with a computer program for dynamic rate capping of subscriber data transmissions is illustrated in FIG. 2, which is described above. The computer program encoded on the computer-readable medium can be executed by a network element within the Backhaul Network 100, ASN-GW 130 and/or a base station.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for dynamic rate capping of data transmissions in a communications network, the method comprising:
periodically determining, by a network element in at least one of a backhaul network, an access service network gateway and a base station in the communications network, a data transmission rate cap for a subscriber based upon a backhaul parameter of a backhaul network in the communications network; and dynamically capping, by the network element, a rate of data transmissions of the subscriber based on the data transmission rate cap.

2. The method of claim 1, wherein the backhaul parameter includes at least one of a backhaul load, a maximum backhaul capacity and a backhaul rate boost factor.

3. The method of claim 1, wherein periodically determining the data transmission rate cap is further based upon a sector parameter including at least one of a sector load, a maximum sector capacity and a sector rate boost factor.

4. A method for dynamic rate capping of data transmissions in a communications network, the method comprising:

periodically determining, by a network element in at least one of a backhaul network, an access service network gateway and a base station in the communications network, a data transmission rate cap for a subscriber, based upon a minimum data transmission rate limit, a maximum data transmission rate limit and a rate boost factor; and dynamically capping, by the network element, a rate of data transmissions of the subscriber based on the data transmission rate cap.

5. The method of claim 4, wherein the data transmission rate cap satisfies the following equation:

data transmission rate cap=minimum data transmission rate limit+(rate boost factor×(maximum data transmission rate limit−minimum data transmission rate limit)).

6. The method of claim 4, wherein the rate boost factor has a value between 0 and 1.

7. The method of claim 4, wherein the boost factor is the minimum of a backhaul rate boost factor, a sector rate boost factor and a value of 1.

8. The method of claim 7, wherein the backhaul rate boost factor and the sector rate boost factor satisfy the following equations:

backhaul rate boost factor=$K1$×($TH$−backhaul load)× (maximum backhaul capacity/bandwidth requested by subscriber);

and sector rate boost factor=$K2$×($TH$−sector load)×(maximum sector capacity/bandwidth requested by subscriber)×subscriber coverage quality, where K1 and K2 are configuration parameters, each having a constant value less than 1, and TH is a maximum load threshold percentage.

9. The method of claim 7, wherein the backhaul rate boost factor and the sector rate boost factor have values between 0 and 1.

10. A method for dynamic rate capping of data transmissions in a network, the method comprising:

determining subscriber parameters including a subscriber requested bandwidth, a minimum data transmission rate limit and a maximum data transmission rate limit;

measuring network parameters including at least one of a sector parameter, a backhaul parameter and a subscriber coverage quality parameter;

calculating a subscriber rate boost factor, based upon a backhaul rate boost factor and a sector rate boost factor;

periodically determining a transmission rate cap for a subscriber, based upon the subscriber parameters and the network parameters; and dynamically capping, by a network element, a rate of subscriber data transmissions in the network based on the transmission rate cap.

11. The method of claim 10, wherein the network parameters include at least one of maximum sector capacity, sector load, subscriber coverage quality, maximum backhaul capacity and backhaul load.

12. The method of claim 11, wherein the maximum sector capacity is equal to average sector throughput divided by average slot utilization, and the subscriber coverage quality is equal to bits per slot/480.

13. The method of claim 12, wherein the subscriber coverage quality is normalized between 0 and 1.

14. The method of claim 10, wherein the backhaul rate boost factor and the sector rate boost factor satisfy the following equations:

backhaul rate boost factor=$K1$×($TH$−backhaul load)× (maximum backhaul capacity/bandwidth requested by subscriber);

and sector rate boost factor=$K2$×($TH$−sector load)×(maximum sector capacity/bandwidth requested by subscriber)×subscriber coverage quality, where K1 and K2 are configuration parameters, each having a constant value less than 1, and TH is a maximum load threshold percentage.

15. The method of claim 10, wherein the data transmission rate cap for the subscriber satisfies the following equation:

data transmission rate cap=minimum data transmission rate limit+boost factor×(maximum data transmission rate limit−minimum data transmission rate limit).

16. The method of claim 10, wherein the backhaul rate boost factor and the sector rate boost factor have values between 0 and 1.

17. A non-transitory computer-readable medium encoded with a computer program for dynamic rate capping in a communications network, the computer program instructing a processor to perform the following steps:

periodically determining a data transmission rate cap for a subscriber based upon a backhaul parameter of a backhaul network in the communications network; and dynamically capping, by a network element, a rate of data transmissions of the subscriber based on the data transmission rate cap.

18. The non-transitory computer-readable medium of claim 17, wherein the backhaul parameter includes at least one of a backhaul load, a maximum backhaul capacity and a backhaul rate boost factor.

19. The non-transitory computer-readable medium of claim 17, wherein periodically determining the data transmission rate cap is further based upon a sector parameter including at least one of a sector load, a maximum sector capacity and a sector rate boost factor.

20. The non-transitory computer-readable medium of claim 19, wherein the backhaul parameter includes at least one of a backhaul load, a maximum backhaul capacity and a backhaul rate boost factor, and the sector parameter includes at least one of a sector load, a maximum sector capacity and a sector rate boost factor.

* * * * *